(12) United States Patent
Yamaguchi et al.

(10) Patent No.: US 10,938,054 B2
(45) Date of Patent: Mar. 2, 2021

(54) METHOD FOR OPERATING REDOX FLOW BATTERY

(71) Applicant: Sumitomo Electric Industries, Ltd., Osaka (JP)

(72) Inventors: Hideyuki Yamaguchi, Osaka (JP); Katsuya Yamanishi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/331,244

(22) PCT Filed: Jul. 2, 2018

(86) PCT No.: PCT/JP2018/025000
§ 371 (c)(1),
(2) Date: Mar. 7, 2019

(87) PCT Pub. No.: WO2019/031101
PCT Pub. Date: Feb. 14, 2019

(65) Prior Publication Data
US 2019/0198905 A1    Jun. 27, 2019

(30) Foreign Application Priority Data

Aug. 8, 2017  (JP) .............................. JP2017-153609

(51) Int. Cl.
*H01M 8/18*   (2006.01)
*H01M 8/04186*   (2016.01)

(52) U.S. Cl.
CPC ....... *H01M 8/188* (2013.01); *H01M 8/04186* (2013.01)

(58) Field of Classification Search
CPC .......................... H01M 8/188; H01M 8/04186
See application file for complete search history.

(56) References Cited

FOREIGN PATENT DOCUMENTS

| JP | 2003-142141 A | 5/2003 | |
| JP | 2003-257467   | * 12/2003 | .............. H01M 8/04 |
| JP | 2003-142141 A | 12/2015 | |

OTHER PUBLICATIONS

Machine translation of JP 2003-257467, retreived from <www.espacenet.com> on Aug. 4, 2020.*

* cited by examiner

*Primary Examiner* — Cynthia K Walls
(74) *Attorney, Agent, or Firm* — Baker Botts L.L.P.; Michael A. Sartori

(57) ABSTRACT

Provided is a method for operating a redox flow battery, the method including a step of mixing a predetermined volume of a positive electrolyte and a predetermined volume of a negative electrolyte at a predetermined period, in which the predetermined period is time x selected from a range of 320 hours or less, the predetermined volume is y % of a storage volume set for one of a positive electrolyte tank and a negative electrolyte tank, y is equal to or higher than a value represented by y=0.01%×x, when x is selected from a range of 30 hours or less, y is equal to or lower than a value represented by y=0.9%×x, and when x is selected from a range of more than 30 hours to 320 hours, y is 27.0% or less.

3 Claims, 4 Drawing Sheets dox flow battery.

The present application claims priority to Japanese Patent Application No. 2017-153609 filed in the Japan Patent Office on Aug. 8, 2017, the entire contents of which is incorporated herein by reference.

BACKGROUND ART

A redox flow battery (hereinafter, also referred to as an "RF battery") is a type of storage batteries. In the RF battery, a charge-discharging operation is performed by supplying a positive electrolyte from a positive electrolyte tank and supplying a negative electrolyte from a negative electrolyte tank to a battery cell (main cell) as described in Patent Literature 1.

CITATION LIST

Patent Literature

PTL 1: Japanese Unexamined Patent Application Publication No. 2003-142141

SUMMARY OF INVENTION

According to the present disclosure, a method of operating a redox flow battery includes a step of:

mixing a predetermined volume of a positive electrolyte and a predetermined volume of a negative electrolyte at a predetermined period, in which the predetermined period is x hours, the predetermined period is selected from a range of 320 hours or less, the predetermined volume of the positive electrolyte and the predetermined volume of the negative electrolyte are each equal to y % of the storage volume set for one of a positive electrolyte tank that stores the positive electrolyte containing vanadium ions and a negative electrolyte tank that stores the negative electrolyte containing vanadium ions, when x is selected from a range of 320 or less, y is equal to or higher than a value represented by y=0.01×x, when x is selected from a range of 30 or less, y is equal to or lower than a value represented by y=0.9×x, and when x is selected from a range of more than 30 to 320, y is 27.0 or less.

DESCRIPTION OF EMBODIMENTS

Problem to be Solved by Present Disclosure

It is desired to minimize the amount of hydrogen generated during the operation of a redox flow battery (RF battery).

Figure 2:
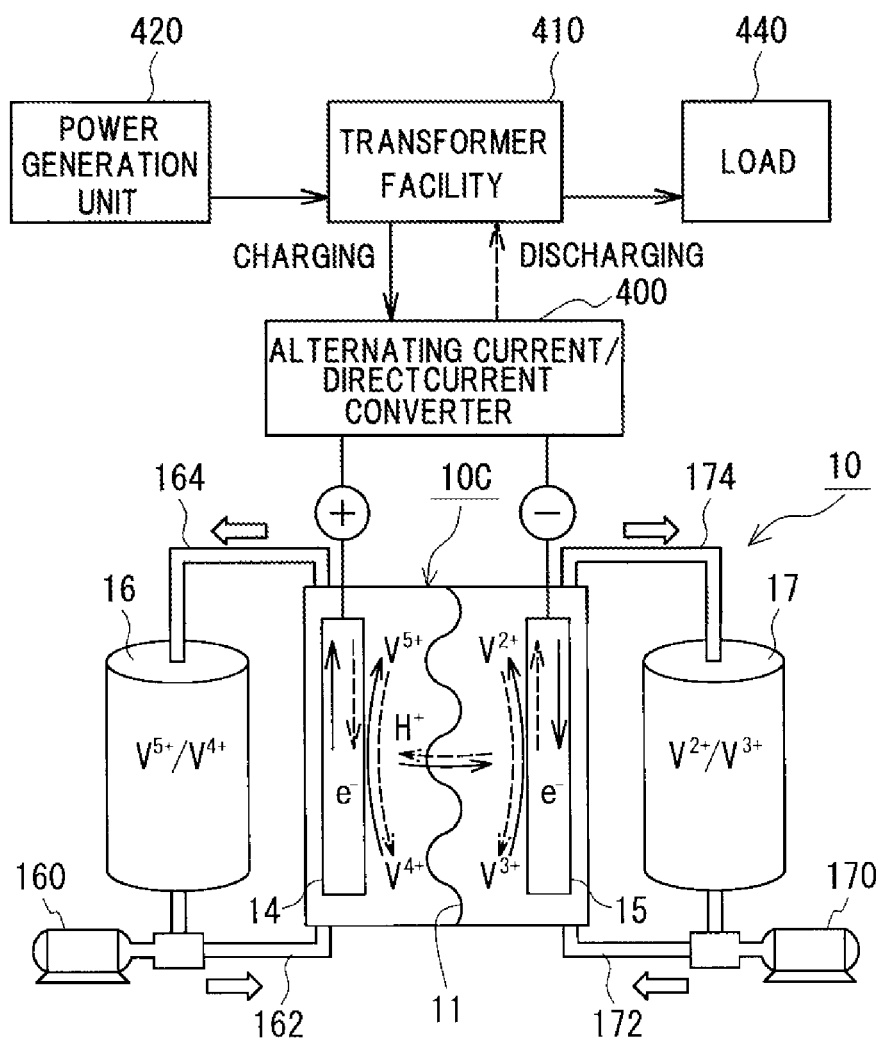
FIG. 2 illustrates the principle of operation of a redox flow battery.

When a vanadium-based RF battery as described in Patent Literature 1 is charged and discharged over a long period of time, vanadium ions are transferred from a negative electrode side to a positive electrode side to decrease the vanadium ions (decrease the concentration of the vanadium ions) on the negative electrode side; thus, the state of charge (charging depth, hereinafter also referred to as "SOC") on the negative electrode side may approach 100% or even exceed 100%. When SOC on the negative electrode side is increased as described above, the amount of hydrogen gas generated on the negative electrode side increases rapidly as illustrated in FIG. 2 of Patent Literature 1.

Patent Literature 1 discloses that the amount of hydrogen gas generated can be reduced by operating the battery in such a manner that SOC on the negative electrode side is 85% or less. It is desirable that the amount of hydrogen gas generated be further reduced, preferably substantially zero from the viewpoint of safety and so forth.

Accordingly, it is an object to provide a method for operating a redox flow battery in which the amount of hydrogen generated can be reduced.

Advantageous Effects of Present Disclosure

In the method for operating a redox flow battery according to the present disclosure, the amount of hydrogen generated can be reduced.

DESCRIPTION OF EMBODIMENTS OF PRESENT INVENTION

Embodiments of the present invention are first listed and explained below.

(1) A method for operating a redox flow battery (RF battery) according to an embodiment of the present invention includes a step of:

mixing a predetermined volume of a positive electrolyte and a predetermined volume of a negative electrolyte at a predetermined period, in which the predetermined period is x hours, the predetermined period is selected from a range of 320 hours or less, the predetermined volume of the positive electrolyte and the predetermined volume of the negative electrolyte are each equal to y % of storage volume set for one of a positive electrolyte tank that stores the positive electrolyte containing vanadium ions and a negative electrolyte tank that stores the negative electrolyte containing vanadium ions, when x is selected from a range of 320 or less, y is equal to or higher than a value represented by y=0.01×x, when x is selected from a range of 30 or less, y is equal to or lower than a value represented by y=0.9×x, and when x is selected from a range of more than 30 to 320, y is 27.0 or less.

In the method for operating an RF battery, relatively small amounts of the electrolytes are mixed at a period of 320 hours or less. Specifically, the volume of one of the electrolytes mixed in one mixing operation (hereinafter, also referred to as a "unit volume") is in a range that satisfies a specific mixing percentage y (%) with reference to the storage volume preset for one of the tanks. The positive electrolyte and the negative electrolyte are mixed by supplying a specific unit volume of the negative electrolyte from the negative electrolyte tank to a positive electrode side while a specific unit volume of the positive electrolyte is supplied from the positive electrolyte tank to a negative electrode side. In the method for operating an RF battery, the specific unit volumes of the electrolytes are mixed at a relatively short period of 320 hours or less, thereby reducing a decrease in the concentration of vanadium ions on the negative electrode side and an increase in SOC on the negative electrode side. Thus, in the method for operating an RF battery, the amount of hydrogen gas generated by the decrease in the concentration of vanadium ions on the negative electrode side and by the increase in SOC on the negative electrode side can be reduced. Preferably, the generation of hydrogen gas can be suppressed.

The unit volume is relatively small and in the range of 27.0% or less of the storage volume, thereby reducing the amount of heat generated during mixing. Accordingly, in the method for operating an RF battery, the formation of a vanadium-containing precipitation or the like due to heat generation in the positive electrolyte during the mixing can be inhibited. This can also inhibit, for example, the degradation of battery characteristics due to the precipitation.

(2) In the method for operating an RF battery according to an embodiment, the predetermined period is selected from a range of 260 hours or less, when x is selected from a range of 260 or less, y is equal to or higher than a value represented by $y=0.03 \times x$, when x is selected from a range of 60 or less, y is equal to or lower than a value represented by $y=0.4 \times x$, and when x is selected from a range of more than 60 to 260 or less, y is 24.0 or less.

According to this embodiment, the amount of hydrogen generated is more easily reduced, and the formation of a precipitation is more easily reduced.

(3) In the method for operating an RF battery according to an embodiment, the predetermined period is selected from a range of 200 hours or less, when x is selected from a range of 200 or less, y is equal to or higher than a value represented by $y=0.045 \times x$, when x is selected from a range of 100 or less, y is equal to or lower than a value represented by $y=0.2 \times x$, and when x is selected from a range of more than 100 to 200 or less, y is 20.0 or less.

According to this embodiment, the amount of hydrogen generated is more easily reduced, and the formation of a precipitation is more easily reduced.

DETAILS OF EMBODIMENTS OF PRESENT INVENTION

Embodiments of the present invention will be specifically described below with reference to the drawings. In the drawings, like numerals denote like elements.

Embodiment

A redox flow (RF) battery 10 according to an embodiment for use in performing a method for operating an RF battery will be described mainly with reference to FIGS. 2 and 3.

(Outline of RF Battery)

As illustrated in FIG. 2, the RF battery 10 includes a battery cell 10C and a circulation mechanism by which a positive electrolyte and a negative electrolyte are circulated and supplied to the battery cell 10C.

Typically, the RF battery 10 is connected to a power generation unit 420 and a load 440 such as a power system or a consumer through, for example, an alternating current/direct current converter 400 and a transformer facility 410. Charging is performed with the power generation unit 420 serving as a power source. Discharging is performed with the load 440 serving as a power supply target. Examples of the power generation unit 420 include solar photovoltaic power generators, wind power generators, and other general power plants.

<Battery Cell>

The battery cell 10C includes a positive electrode 14 to which a positive electrolyte is supplied, a negative electrode 15 to which a negative electrolyte is supplied, and a membrane 11 interposed between the positive electrode 14 and the negative electrode 15. In addition to a single-cell battery including a single battery cell 10C as illustrated in FIG. 2, the RF battery 10 is also used in the form of a multi-cell battery including a plurality of the battery cells 10C. Typically, the multi-cell battery is used in the form of a cell stack 30 illustrated in FIG. 3.

Figure 3:
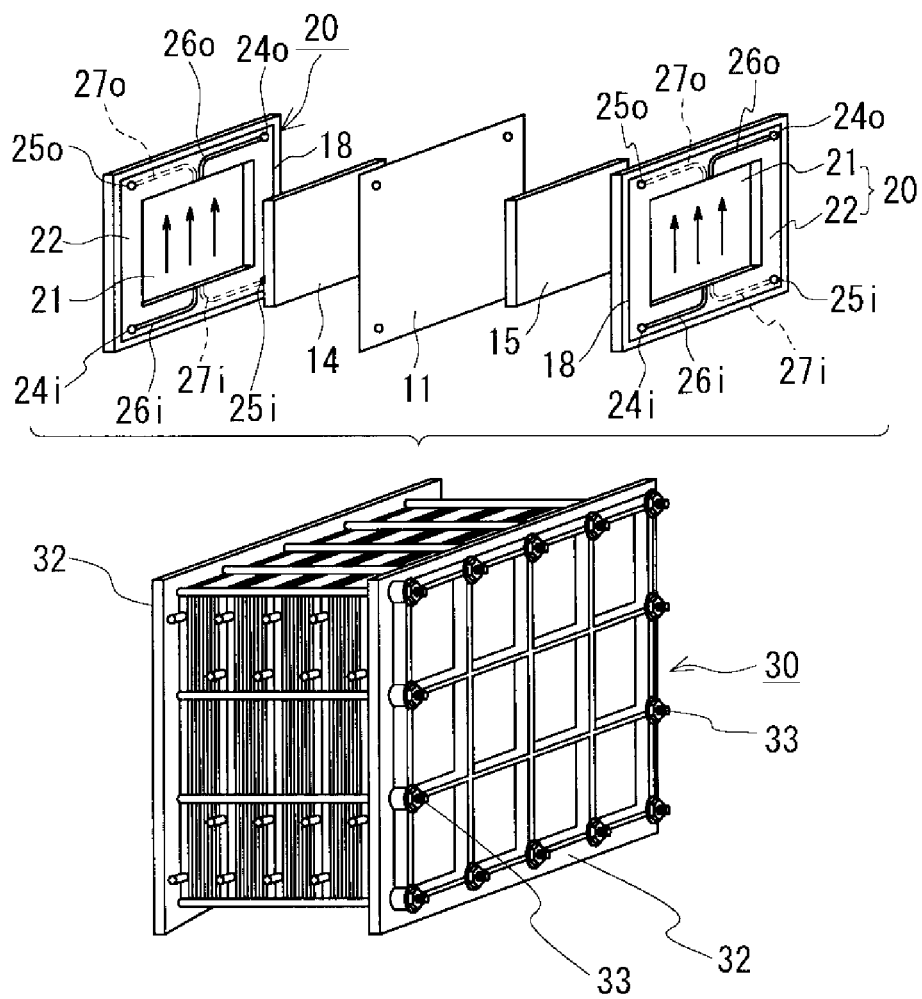
FIG. 3 is a schematic diagram illustrating a cell stack included in a redox flow battery and is an exploded perspective view illustrating a battery cell.

The battery cell 10C typically includes cell frames 20 illustrated in FIG. 3. Each of the cell frames 20 includes, for example, a bipolar plate 21 having one surface on which a positive electrode 14 is disposed and the other surface on which a negative electrode 15 is disposed, and a frame body 22 disposed at the peripheral portion of the bipolar plate 21, the frame body 22 including a positive electrolyte supply passage and a positive electrolyte drainage passage on one surface and a negative electrolyte supply passage and a negative electrolyte drainage passage on the other surface. The positive electrolyte supply passage and the negative electrolyte supply passage include liquid supply holes 24*i* and 25*i*, respectively, and slits 26*i* and 27*i*, respectively, extending from the liquid supply holes 24*i* and 25*i* to the inner peripheral portions of the frame body 22. The positive electrolyte drainage passage and the negative electrolyte drainage passage include liquid drainage holes 24*o* and 25*o*, respectively, and slits 26*o* and 27*o*, respectively, extending from the inner peripheral portions to the liquid drainage holes 24*o* and 25*o*, respectively. By stacking the cell frames 20, the liquid supply holes 24*i* and 25*i* and the liquid drainage holes 24*o* and 25*o*, which are through holes, are formed into respective flow paths for the electrolytes. In addition, a sealing material 18 is disposed on the outer peripheral side of each frame body 22 of this embodiment.

The cell stack 30 includes a layered body including the cell frame 20 (bipolar plate 21), the positive electrode 14, the membrane 11, and the negative electrode 15 stacked in this order, a pair of end plates 32 and 32 that sandwich the layered bodies, and fastening members 33 that fasten the end plates 32 and 32. By fastening the end plates 32 and 32 with the fastening members 33, a stacked state is maintained, and the sealing material 18 interposed between adjacent cell frames 20 and 20 is deformed by pressing to impart fluid-tight characteristics thereto. As illustrated in FIG. 3, the cell stack 30 may include subcell stacks each having a predetermined number of the battery cells 10C.

<Circulation Mechanism>

As illustrated in FIG. 2, the circulation mechanism includes a positive electrolyte tank 16 to store the positive electrolyte that is circulated and supplied to the positive electrode 14, a negative electrolyte tank 17 to store the negative electrolyte that is circulated and supplied to the negative electrode 15, pipes 162 and 164 that connect the positive electrolyte tank 16 to the battery cell 10C (or the cell stack), pipes 172 and 174 that connect the negative electrolyte tank 17 to the battery cell 10C (or the cell stack), and pumps 160 and 170 disposed on the supply-side pipes 162 and 172, respectively. The pipes 162, 164, 172, and 174 are connected to the flow path formed of the liquid supply holes 24$i$ and 25$i$ and the flow path formed of the liquid drainage holes 24$o$ and 25$o$, thereby forming circulation paths for both the electrolytes.

As the basic structure, the material, and so forth of the RF battery 10, known structures, materials, and so forth can be appropriately used.

<Electrolyte>

Here, the electrolytes used in the RF battery 10 are vanadium-based electrolytes containing vanadium ions serving as an active material. Typically, the positive electrolyte contains tetravalent and pentavalent vanadium ions. The negative electrolyte contains divalent or trivalent vanadium ions. A typical example of each of the vanadium-based electrolytes is an aqueous solution containing sulfuric acid and so forth.

(Method for Operating RF Battery)

The method for operating an RF battery according to an embodiment includes a step of mixing (hereinafter, also referred to as a "mixing step") a predetermined volume of the positive electrolyte and a predetermined volume of the negative electrolyte at a predetermined period. In particular, in the method for operating an RF battery according to the embodiment, small amounts of the positive electrolyte and the negative electrolyte are mixed at a relatively high frequency and a relatively short period in a relatively small unit volume. As just described, in the method for operating an RF battery according to the embodiment, in particular, the concentration of vanadium ions and SOC in the negative electrolyte are adjusted by frequently mixing them in the small amounts intentionally, thereby reducing the amount of hydrogen gas generated on the negative electrode side.

As specific conditions of the mixing step, three conditions are described below.

<First Condition>

<<Period>> x hours selected from a range of 320 hours or less.

<<Volume of Electrolyte Mixed in One Mixing Operation (Unit Volume)>>y % of a storage volume set for one of the positive electrolyte tank 16 that stores the positive electrolyte containing vanadium ions and the negative electrolyte tank 17 that stores the negative electrolyte containing vanadium ions.

(Lower Limit of y) When x is selected from a range of 320 or less, a value equal to or higher than a value represented by y=0.01×x.

(Upper Limit of y) When x is selected from a range of 30 or less, a value equal to or lower than a value represented by y=0.9×x.

When x is selected from a range of more than 30 to 320, y=27.0 or less.

<Second Condition>

<<Period>> x hours selected from a range of 260 hours or less.

<<Unit Volume>>

(Lower Limit of y) When x is selected from a range of 260 or less, a value equal to or higher than a value represented by y=0.03×x.

(Upper Limit of y) When x is selected from a range of 60 or less, a value equal to or lower than a value represented by y=0.4×x.

When x is selected from a range of more than 60 to 260, y=24.0 or less.

<Third Condition>

<<Period>> x hours selected from a range of 200 hours or less.

<<Unit Volume>>

(Lower Limit of y) When x is selected from a range of 200 or less, a value equal to or higher than a value represented by y=0.045×x.

(Upper Limit of y) When x is selected from a range of 100 or less, a value equal to or lower than a value represented by y=0.2×x.

When x is selected from a range of more than 100 to 200, y=20.0 or less.

The storage volume of the positive electrolyte tank 16 and the storage volume of the negative electrolyte tank 17 may be appropriately set, depending on, for example, the battery capacity of the RF battery 10, and may be equal or different. In the case where the positive and negative electrolyte tanks have different storage volumes, for example, the storage volume used as the reference of the unit volume is the storage volume of the negative electrolyte tank 17 in which hydrogen is generated.

At a relatively short period of 320 hours or less, a state in which hydrogen gas is easily generated by decreasing the concentration of vanadium ions on the negative electrode side and increasing the SOC of the negative electrode is easily prevented from being maintained for a long time, thus reducing the amount of hydrogen gas generated. Because a shorter period more easily provides the effect, the period may be 300 hours or less, 280 hours or less, 260 hours or less, 250 hours or less, or 200 hours or less.

At an excessively short period, a sufficient operating time of charge and discharge is not easily ensured. Thus, the period may be more than 10 hours, 15 hours or more, 20 hours or more, 24 hours or more, or 25 hours or more. Even if the period is more than 24 hours, the use of a specific unit volume can effectively reduce the amount of hydrogen gas generated.

The unit volume is desirably such that the decrease in the concentration of vanadium ions on the negative electrode side and the increase in SOC on the negative electrode side can be inhibited to reduce the amount of hydrogen gas generated. The unit volume is desirably changed, depending on the period. This is because a longer period is more likely to cause the increase in SOC on the negative electrode side. Thus, the unit volume is linearly increased with the length of time x of the period as a variable. Specifically, the unit volume is set to a value equal to or higher than the storage volume×(0.01%×x). A larger unit volume, i.e., a larger coefficient of x (rate of change), results in, for example, an easy increase in the degree of a reduction in the SOC of the negative electrolyte due to the mixing of the positive and negative electrolytes, thereby more easily reducing the generation of hydrogen gas. From the viewpoint of suppressing the generation of hydrogen, the unit volume may be a value equal to or higher than the storage volume×(0.03%×x) or even a value equal to or higher than the storage volume× (0.045%×x).

The use of an excessive unit volume causes the electrolytes to generate heat during mixing. In particular, the heat generation leads to electrolyte degradation such as the formation of a precipitation in the positive electrolyte, thereby leading to the degradation of battery characteristics. Accordingly, the unit volume is desirably in a range that does not cause the degradation of the battery characteristics due to the heat generation. From the viewpoint of suppressing the degradation of the battery characteristics, for example, the mixing percentage y (%) of the unit volume is set to a fixed value (here, 27.0) or less. As described in a test example described below, it was found that in the case where the period is set to be short or long to some extent in the range of 320 hours or less, the upper limit of the unit volume is preferably changed, depending on the period. Based on this finding, when the period is 30 hours or less, the mixing percentage y (%) is set to a proportional amount (0.9×x) in which the time x (hours) of the period is a variable and the rate of change (slope) is 0.9.

When the unit volume is a value equal to or lower than the storage volume×(0.9%×x) or a value equal to or lower than the storage volume×27.0%, the unit volume is not excessively large. Thus, the degradation of the electrolytes due to the heat generation during mixing, and by extension, the degradation of the battery characteristics can be prevented.

In the case where the upper limit of the period is shortened, a reduction of unit volume is desirable because the degradation of the electrolytes due to the heat generation during the mixing and the degradation of the battery characteristics are easily prevented. For example, when the period is in the range of 260 hours or less, the mixing percentage y (%) of the unit volume is 24.0 or less. In particular, when the period is selected from 60 hours or less, the mixing percentage y (%) is a value equal to or lower than (0.4×x). When the period is in the range of 200 hours or less, the mixing percentage y (%) of the unit volume is 20.0 or less. In particular, when the period is selected from 100 hours or less, the mixing percentage y (%) is a value equal to or lower than (0.2×x).

The mixing step is preferably performed, depending on a predetermined period. The period is selected so as to overlap a standby time during which a charge-discharge operation is not performed. When the mixing step is performed during the standby time, the charge-discharge time can be sufficiently ensured. In the mixing step, a predetermined volume of the negative electrolyte stored in the negative electrolyte tank is supplied to the positive electrode side while a predetermined volume of the positive electrolyte stored in the positive electrolyte tank is supplied to the negative electrode side. In other words, the predetermined volumes of the positive and negative electrolytes are exchanged. Examples of a mixing method are described below.

(α) A pipe through which the positive electrolyte drained from the battery cell 10C is supplied to the negative electrolyte tank 17 is disposed, and a pipe through which the negative electrolyte drained from the battery cell 10C is supplied to the positive electrolyte tank 16 is disposed.

(β) The pressure of the pump 160 on the positive electrode side is set to a value higher than the pressure of the pump 170 on the negative electrode side, thereby supplying the unit volume of the positive electrolyte and the unit volume of the negative electrolyte to the battery cell 10C.

(γ) During the mixing step, the temperature of the electrolytes is increased, and the unit volume of the positive electrolyte and the unit volume of the negative electrolyte are supplied to the battery cell 10C.

Figure 4:
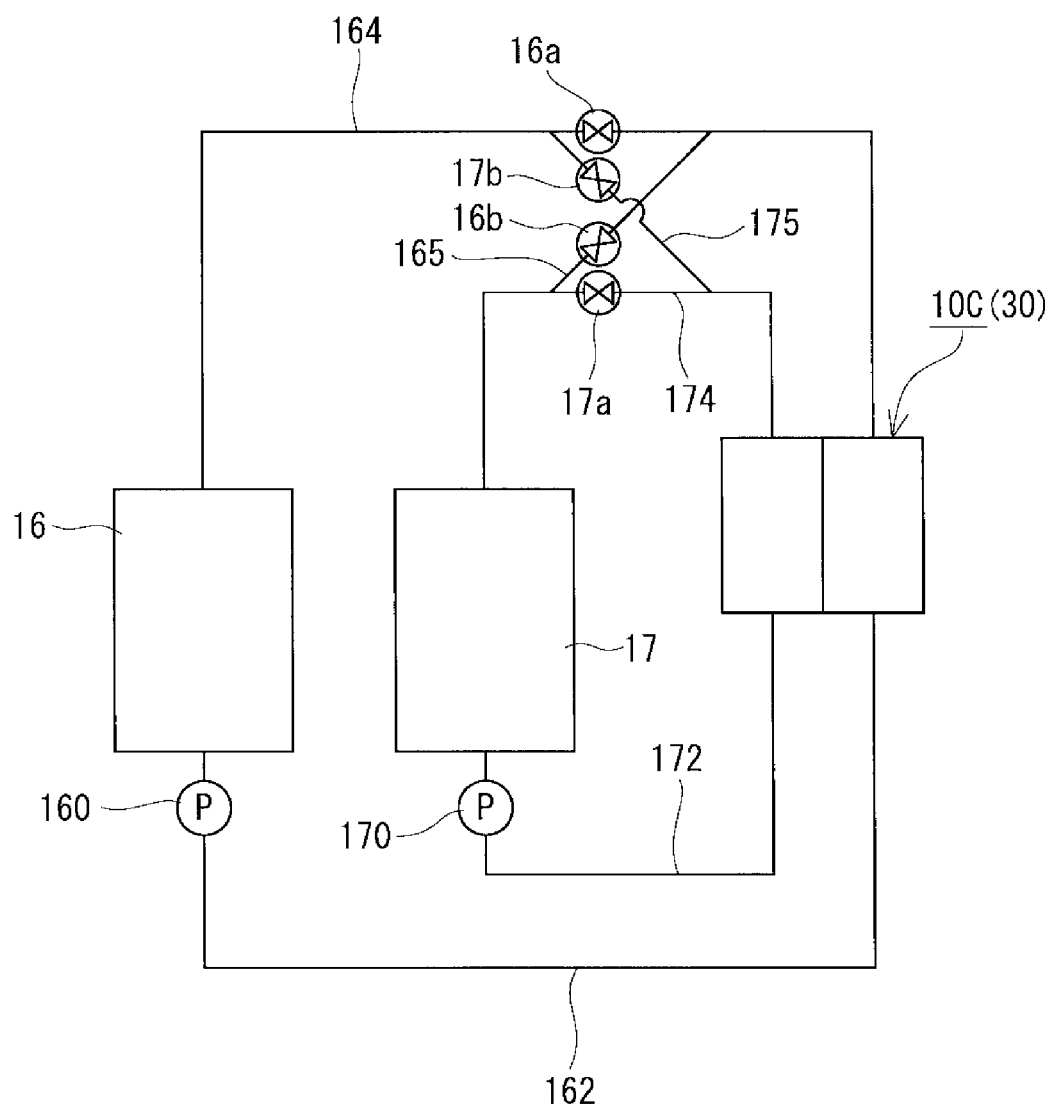
FIG. 4 is a schematic diagram illustrating a redox flow battery including pipes used for the mixing of electrolytes.

In the method (α), for example, as illustrated in FIG. 4, two pipes 165 and 175 connecting the pipe 164 on the drainage side of the positive electrode to the pipe 174 on the drainage side of the negative electrode are disposed, and valves 16a, 16b, 17a, and 17b are disposed on the pipes 164, 165, 174, and 175. During a normal charge-discharge operation, the valves 16a and 17a on the pipes 164 and 174 on the drainage side are opened, and the valves 16b and 17b on the pipes 165 and 175 for mixing are closed. During the mixing, the valves 16a and 17a on the pipes 164 and 174 on the drainage side are closed, and the valves 16b and 17b on the pipes 165 and 175 for mixing are opened. In this state, the pump 160 on the positive electrode side is driven to supply the unit volume of the positive electrolyte from the positive electrolyte tank 16 to the negative electrolyte tank 17 in order through the positive electrode side of the battery cell 10C, the valve 16b, and the pipe 165. Similarly, the pump 170 on the negative electrode side is driven to supply the unit volume of the negative electrolyte from the negative electrolyte tank 17 to the positive electrolyte tank 16 in order through the negative electrode side of the battery cell 10C, the valve 17b, and the pipe 175. By supplying these electrolytes to each other, the electrolytes can be mixed. In this configuration, in particular, the positive electrolyte passing through the positive electrode side of the battery cell 10C can be supplied to the negative electrode side, thus easily correcting a decrease in the concentration of vanadium ions in the negative electrolyte.

In the methods (β) and (γ), the configuration illustrated in FIG. 2 can be used. In the method (β), the pressure of the pump 160 on the positive electrode side is set to a value higher than pressure on the negative electrode side to supply the positive electrolyte and the negative electrolyte to the battery cell 10C, thereby easily allowing vanadium ions to migrate from the positive electrode side to the negative electrode side in the battery cell 10C. As a result, the concentration of vanadium ions in the negative electrolyte drained from the negative electrode side of the battery cell 10C is increased.

An appropriate heating device may be disposed, for example, on the pipes 164 and 174 between the battery cell 10C and the tanks 16 and 17 so as to increase the temperature of the electrolytes by, for example, about 0.1° C. to about 5° C. In this case, vanadium ions diffuse easily as the temperature of the electrolytes is increased. In the method (γ), the diffusion is used. The positive electrolyte and the negative electrolyte that have a relatively high temperature are supplied to the battery cell 10C. This allows vanadium ions to migrate easily from the positive electrode side to the negative electrode side in such a manner that a uniform concentration of vanadium ions in the positive and negative electrode sides of the battery cell 10C is achieved. Thus, the concentration of vanadium ions in the negative electrolyte drained from the negative electrode side of the battery cell 10C is increased.

A pipe (not illustrated) communicating with the positive electrolyte tank 16 and the negative electrolyte tank 17 is disposed. If there is a difference between the volume of the electrolyte in the positive electrolyte tank 16 and the volume of the electrolyte in the negative electrolyte tank 17 after the mixing step, a step of correcting the difference and equalizing the volumes of the electrolytes may be provided. Hitherto, the positive and negative electrolytes have been mixed in order to correct the imbalance between the volumes of the positive and negative electrolytes, in some cases. However, an appropriate frequency of correction and an appropriate adjustment volume are not sufficiently studied. From the long-term viewpoint, it may be difficult to suppress an increase in SOC on the negative electrode side and so forth by simply equalizing the volumes of the positive and negative electrolytes.

(Application)

The method for operating an RF battery according to an embodiment can be employed for the operation of a storage battery for use in natural energy power generation such as solar photovoltaic power generation or wind power generation, for the purposes of stabilizing fluctuations in power output, storing generated power during oversupply, leveling load, and so forth. The method for operating an RF battery according to an embodiment can be employed for the operation of a storage battery used in a general power plant as countermeasures against momentary voltage drop and power failure and for the purposes of levelling load.

(Advantageous Effect)

In the method for operating an RF battery according to an embodiment, the positive electrolyte and the negative electrolyte are mixed in relatively small unit volumes equal to or lower than about ⅓ of the storage volumes of the tanks at a period of 320 hours or less, thereby reducing the amount of hydrogen gas generated. Furthermore, in the method for operating an RF battery according to an embodiment, the formation of a precipitation in the electrolytes can also be reduced. These effects will be specifically described in the following test examples.

Test Example 1

Positive and negative electrolytes were mixed in different volumes of the electrolytes used for one mixing operation (unit volumes) at different periods. The amount of hydrogen gas generated and the formation of a precipitation in the electrolytes were studied.

A positive electrolyte containing vanadium ions and a negative electrolyte containing vanadium ions are provided. Charge and discharge are repeatedly performed under conditions described below. During the operation, a step of mixing a predetermined unit volume of the positive electrolyte and the predetermined unit volume of the negative electrolyte is performed at a period x (hours) presented in Table 1.

The predetermined unit volume (liters) is defined as a volume obtained by multiplying a storage volume set for one of the tanks by the mixing percentage (%) presented in the left column of Table 1 and then dividing the resulting product by 100 (storage volume (liters)×mixing percentage (%)/100). In this test, the storage volume set for the negative electrolyte tank is used as a reference storage volume.

(Charge-Discharge Operation Conditions)

Constant-current charge: a current density of 120 mA/cm$^2$

Terminal voltage: a minimum discharge voltage of 1 V, and a maximum charge voltage of 1.7 V In this test, after charge and discharge were repeatedly performed under the foregoing conditions until the operating time was 1,000 hours or more in total, the amount of hydrogen gas generated was measured by a gas chromatography method. Table 1 presents the amount of hydrogen gas generated per hour (ml/H).

In this test, after charge and discharge were repeatedly performed under the foregoing conditions until the operating time was 1,000 hours or more in total as described above, the presence or absence of a precipitation containing vanadium or the like in the positive electrolyte was visually checked. Table 1 presents the results.

In the case where the amount of hydrogen gas generated is substantially 0 ml/H and where substantially no precipitation is formed, the hydrogen gas and the precipitation are regarded as being less likely to be generated. This case is rated as VG. In the case where the amount of hydrogen gas generated is substantially 0 ml/H and where the precipitation is visually observed, the hydrogen gas is regarded as being less likely to be generated, and the precipitation is regarded as being easily formed. This case is rated as G. In the case where the amount of hydrogen gas generated is 2,000 ml/H or more, the amount of hydrogen gas generated is regarded as being easily generated. This case is rated as B. Table 1 presents the evaluation results. In the case where a precipitation is present, "precipitated" is written in the remarks column of Table 1.

TABLE 1

| | | | Mixing percentage y (%) | | | | | | | | |
|---|---|---|---|---|---|---|---|---|---|---|---|
| | | | First condition | | Second condition | | Third condition | | Amount of | | |
| Sample No. | Mixing percentage | Period x (hours) | 0.9% x | 0.01% x | 0.4% x | 0.03% x | 0.2% x | 0.045% x | hydrogen generated | Remarks | Evaluation |
| 1 | 3% | 190 | — | 1.9 | — | 5.7 | — | 8.55 | 0 ml/H | — | VG |
| 101 | 1% | 200 | — | 2.0 | — | 6.0 | — | 9.0 | 2120 ml/H | — | B |
| 2 | 8% | 315 | — | 3.15 | — | — | — | — | 0 ml/H | — | VG |
| 102 | 10% | 330 | — | — | — | — | — | — | 2220 ml/H | — | B |
| 3 | 26% | 310 | — | 3.1 | — | — | — | — | 0 ml/H | — | VG |
| 103 | 29% | 320 | — | 3.2 | — | — | — | — | 2500 ml/H | — | B |
| 104 | 28.5% | 130 | — | 1.3 | — | 3.9 | — | 5.85 | 0 ml/H | precipitated | G |
| 4 | 25% | 150 | — | 1.5 | — | 4.5 | — | 6.75 | 0 ml/H | — | VG |
| 105 | 29% | 40 | — | 0.4 | 16.0 | 1.2 | 8.0 | 1.8 | 0 ml/H | precipitated | G |
| 5 | 25% | 35 | — | 0.35 | 14.0 | 1.05 | 7.0 | 1.58 | 0 ml/H | — | VG |
| 106 | 14% | 10 | 9.0 | 0.1 | 4.0 | 0.3 | 2.0 | 0.45 | 0 ml/H | precipitated | G |
| 6 | 15% | 30 | 27.0 | 0.3 | 12.0 | 0.9 | 6.0 | 1.35 | 0 ml/H | — | VG |

As presented in Table 1, in sample Nos. 1 to 6, the amount of hydrogen gas generated is 0 ml/H, which indicates that substantially no hydrogen gas is generated. In sample Nos. 1 to 6, substantially no precipitation is formed. In contrast, in sample Nos. 101 to 103, large amounts of hydrogen gas are generated. Here, in any of the samples, the amount of hydrogen gas generated is 2,120 ml/H or more. In sample Nos. 104 to 106, although substantially no hydrogen gas is generated, a precipitation is formed.

Figure 1:
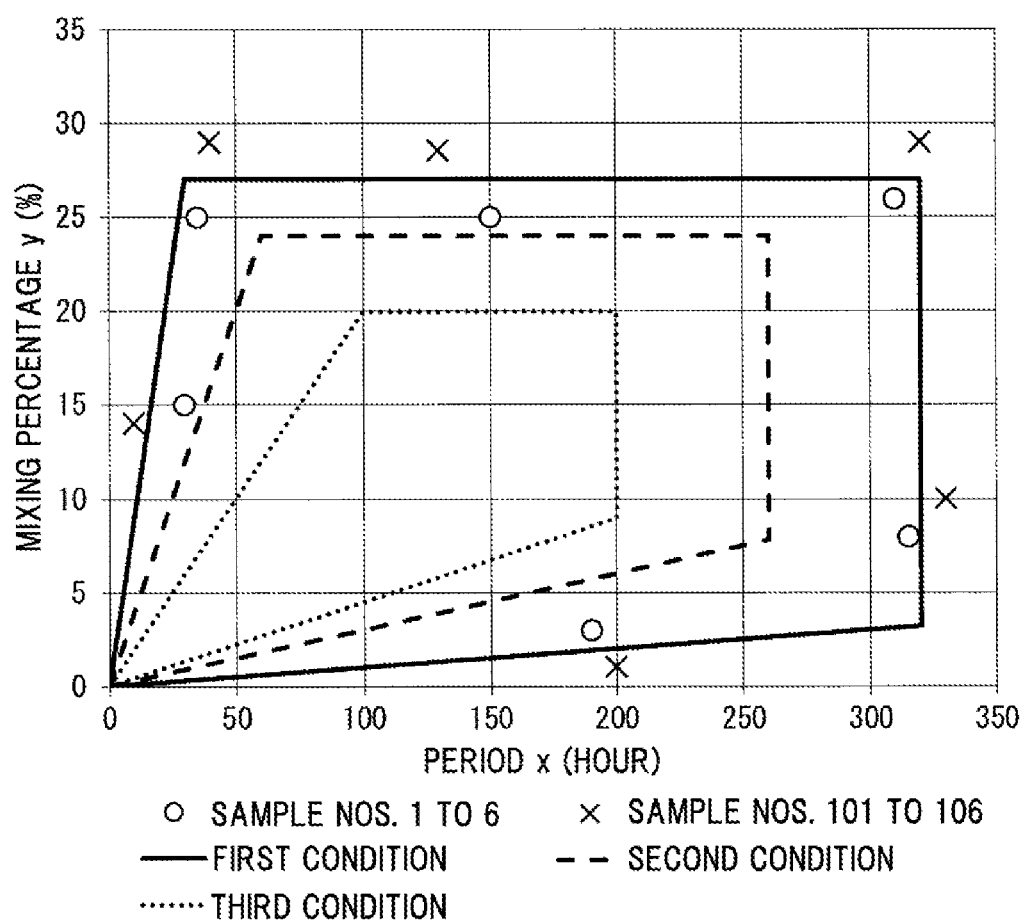
FIG. 1 is a graph illustrating the relationship between a period x (hours) for which electrolytes are mixed and the mixing percentage y (%) of the amount of electrolyte mixed in test example 1.

FIG. 1 is a graph illustrating the relationship between the period (hours) and the mixing percentage (%) of each sample. In this graph, the horizontal axis represents the period x (hours), and the vertical axis represents the mixing percentage y (%). From this graph, conditions (a) and (b) that can reduce the amount of hydrogen gas generated and, furthermore, conditions (c) and (d) that can reduce a precipitation are conceivable.

(a) Comparisons between sample Nos. 2 and 102 and between sample Nos. 3 and 103 indicate that the period is preferably less than 330 hours.

(b) A comparison between sample Nos. 1 and 101 indicates that in the case of a period of about 200 hours, the mixing percentage is preferably more than 1%.

(c) Comparisons between a sample group consisting of sample Nos. 3 to 5 and a sample group consisting of sample Nos. 103 to 105 indicate that a boundary where hydrogen gas and the precipitation can be reduced is preferably provided between these sample groups.

(d) Comparisons between sample Nos. 5 and 6 and sample No. 106 indicate that apart from the boundary described in (c), a boundary where hydrogen gas and the precipitation can be reduced is preferably provided. This boundary is preferably provided between sample Nos. 5 and 6 and sample No. 106.

From (b) described above, assuming that the mixing percentage y (%) is represented by a proportional expression with the length of time x (hours) of the period as a variable, the slope of a proportional expression passing through sample No. 1 is about 0.0158, and the slope of a proportional expression passing through sample No. 101 is 0.005. The average of these slopes is about 0.01. It is thus reasonable to use y=0.01×x as a boundary formula of the mixing percentage y (%) that can reduce the amount of hydrogen gas generated.

From (c) described above, it is reasonable to use y=27.0 as a boundary formula of the mixing percentage y (%) that can reduce the amount of hydrogen gas generated and the formation of the precipitation.

From (d) described above, assuming that the mixing percentage y (%) is represented by a proportional expression with the length of time x (hours) of the period as a variable, the slope of a proportional expression passing through sample No. 5 is 0.714, the slope of a proportional expression passing through sample No. 6 is 0.5, and the slope of a proportional expression passing through sample No. 106 is 1.4. The average of these slopes is about 0.9. It is thus reasonable to use y=0.9×x as a boundary formula of the mixing percentage y (%) that can reduce the amount of hydrogen gas generated and the formation of the precipitation.

When the boundary formula y=27.0 obtained from (c) intersects with the boundary formula y=0.9×x obtained from (d), x=30. It is thus reasonable to use y=0.9×x as a boundary formula when x≤30.

The combination of (a) to (d) provides the <first condition> described above. A region surrounded by a thick solid line in the graph of FIG. 1 satisfies the <first condition>. The boundary formulae of the region are y=0.9×x, y=27.0, y=0.01×x, and x=320. Sample Nos. 1 to 6 are included in the region surrounded by the thick solid line. Thus, the amount of hydrogen gas generated and, furthermore, the amount of precipitation formed can be reduced. Table 1 also presents the value of 0.9×x (x≤30) and the value of 0.01×x (x≤320) as the mixing percentage y (%).

This test indicated the following: By mixing the electrolytes in the unit volume at the period, the unit volume and the period satisfying the <first condition>, the amount of hydrogen gas generated can be reduced. Furthermore, the amount of precipitation formed in the electrolytes can be reduced. Preferably, the generation of both thereof can be suppressed.

A region surrounded by a thick broken line in the graph of FIG. 1 is located inside the points of sample Nos. 1 to 6 and determined as described below. Specifically, as a value of x<320, x=260. As a value of y<27.0, y=24.0. As a value that satisfies y>0.01×x and that is larger than the slope (0.0158) of the proportional expression passing through sample No. 1, y=0.03×x. As a value that satisfies y<0.9%×x and that is smaller than the slope (0.5) of the proportional expression passing through sample No. 6, y=0.4. The region surrounded by the thick broken line satisfies the <second condition> described above.

A region surrounded by a dotted line in the graph of FIG. 1 is located inside the region surrounded by the thick broken line and determined as described below. Specifically, as a value of x<260, x=200. As a value y<24.0, y=20.0. As a value of y>0.03×x, y=0.045×x. As a value that satisfies y<0.4×x, y=0.2. The region surrounded by the dotted line satisfies the <third condition> described above. Table 1 also presents the value of 0.4×x (x≤60) and the value of 0.03×x (x≤260) as the mixing percentage y (%) under the <second condition> and presents the value of 0.2×x (x≤100) and the value of 0.045×x (x≤200) as the mixing percentage y (%) under the <third condition>.

In the case of satisfying the <second condition> located inside the region that satisfies the <first condition>, and furthermore, in the case of satisfying the <third condition> located inside the region that satisfies the <second condition>, the period is easily set to an appropriate time, and the unit volume is easily set to an appropriate volume, compared with the case of satisfying the <first condition>. Thus, the amount of hydrogen gas generated and the amount of precipitation in each electrolyte should be further reduced.

The present invention is not limited to these embodiments. The present invention is indicated by the appended claims. It is intended to include any modifications within the scope and meaning equivalent to the scope of the claims

REFERENCE SIGNS LIST 10 redox flow battery (RF battery)
10c battery cell
11 membrane
14 positive electrode
15 negative electrode
16 positive electrolyte tank
17 negative electrolyte tank
160, 170 pump
162, 164, 165, 172, 174, 175 pipe
16a, 16b, 17a, 17b valve
18 sealing material
20 cell frame
21 bipolar plate
22 frame body
24i, 25i liquid supply hole
24o, 25o liquid drainage hole
26i, 26o, 27i, 27o slit
30 cell stack
32 end plate
33 fastening member
400 alternating current/direct current converter
410 transformer facility
420 power generation unit
440 load

The invention claimed is:

1. A method for operating a redox flow battery, comprising a step of:
   mixing a predetermined volume of a positive electrolyte and a predetermined volume of a negative electrolyte at a predetermined period,
   wherein the predetermined period is x hours,
   the predetermined period is selected from a range of 320 hours or less, the predetermined volume of the positive electrolyte and the predetermined volume of the negative electrolyte are each equal to y % of a storage volume set for one of a positive electrolyte tank that stores the positive electrolyte containing vanadium ions and a negative electrolyte tank that stores the negative electrolyte containing vanadium ions, when x is selected from a range of 320 or less, y is equal to or higher than a value represented by $y=0.01 \times x$, when x is selected from a range of 30 or less, y is equal to or lower than a value represented by $y=0.9 \times x$, and when x is selected from a range of more than 30 to 320, y is 27.0 or less.

2. The method for operating a redox flow battery according to claim 1, wherein the predetermined period is selected from a range of 260 hours or less, when x is selected from a range of 260 or less, y is equal to or higher than a value represented by $y=0.03 \times x$, when x is selected from a range of 60 or less, y is equal to or lower than a value represented by $y=0.4 \times x$, and when x is selected from a range of more than 60 to 260, y is 24.0 or less.

3. The method for operating a redox flow battery according to claim 1, wherein the predetermined period is selected from a range of 200 hours or less, when x is selected from a range of 200 or less, y is equal to or higher than a value represented by $y=0.045 \times x$, when x is selected from a range of 100 or less, y is equal to or lower than a value represented by $y=0.2 \times x$, and when x is selected from a range of more than 100 to 200, y is 20.0 or less.

* * * * *